(12) United States Patent     (10) Patent No.:   US 12,568,392 B2

Moon et al.     (45) Date of Patent:   Mar. 3, 2026

(54) MEASURING RADIO CHARACTERISTICS OF MEASUREMENT OBJECTS

(71) Applicant: Telefonaktiebolaget LM Ericsson (publ), Stockholm (SE)

(72) Inventors: Hyunchul Moon, Seoul (KR); Jaewook Lee, Seoul (KR); Duckjung Kim, Anyang-si (KR); Sungman Jang, Seoul (KR); Hoyoung Choi, Pennant Hills (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 18/556,442

(22) PCT Filed: Apr. 23, 2021

(86) PCT No.: PCT/SE2021/050373

§ 371 (c)(1),
(2) Date: Oct. 20, 2023

(87) PCT Pub. No.: WO2022/225430

PCT Pub. Date: Oct. 27, 2022

(65) Prior Publication Data

US 2024/0187912 A1     Jun. 6, 2024

(51) Int. Cl.
*H04W 24/10*     (2009.01)
*H04W 36/00*     (2009.01)

(52) U.S. Cl.
CPC ....... *H04W 24/10* (2013.01); *H04W 36/0058* (2018.08); *H04W 36/0088* (2013.01)

(58) Field of Classification Search
None
See application file for complete search history.

(56) References Cited

U.S. PATENT DOCUMENTS

| | | | |
|---|---|---|---|
| 10,998,989 B2 * | 5/2021 | Kwak | H04W 76/11 |
| 2020/0045573 A1 * | 2/2020 | Kim | H04W 24/10 |

(Continued)

FOREIGN PATENT DOCUMENTS

| | | |
|---|---|---|
| WO | 2020256443 A1 | 12/2020 |
| WO | 2021029686 A1 | 2/2021 |

OTHER PUBLICATIONS

International Search Report and Written Opinion dated Dec. 20, 2021 for International Application No. PCT/SE2021/050373 filed Apr. 23, 2021, consisting of 10-pages.

(Continued)

*Primary Examiner* — Jay L Vogel
(74) *Attorney, Agent, or Firm* — Weisberg I.P. Law, P.A.

(57) ABSTRACT

A method for measuring radio characteristics of measurement objects, the method being performed by a user equipment, UE. The method includes: receiving, from a network node, a request to measure and report radio measurements for at least a first measurement object and a second measurement object, wherein the request includes a priority for each measurement object; measuring radio characteristics of the first measurement object; and transmitting measurement status of the second measurement object for which radio characteristics have yet to be measured. The second measurement object has a higher priority than the first measurement object.

17 Claims, 3 Drawing Sheets

(56) References Cited

U.S. PATENT DOCUMENTS

| 2020/0359247 A1 | 11/2020 | Yi et al. | |
| 2021/0076270 A1* | 3/2021 | Sreenivasa | H04W 36/0085 |
| 2021/0376966 A1* | 12/2021 | Sengupta | H04L 1/1829 |
| 2024/0406801 A1* | 12/2024 | Ramachandra | H04W 24/10 |

OTHER PUBLICATIONS

3GPP TSG-RAN WG2 Meeting #110e R2-2004715; Title: Measurement priority handling in NR; Agenda Item: 6.20.1.2; Source: Ericsson; Document for: Discussion, Decision; Date and Location: Jun. 1-12, 2020, Online meeting; consisting of 19-pages.

* cited by examiner

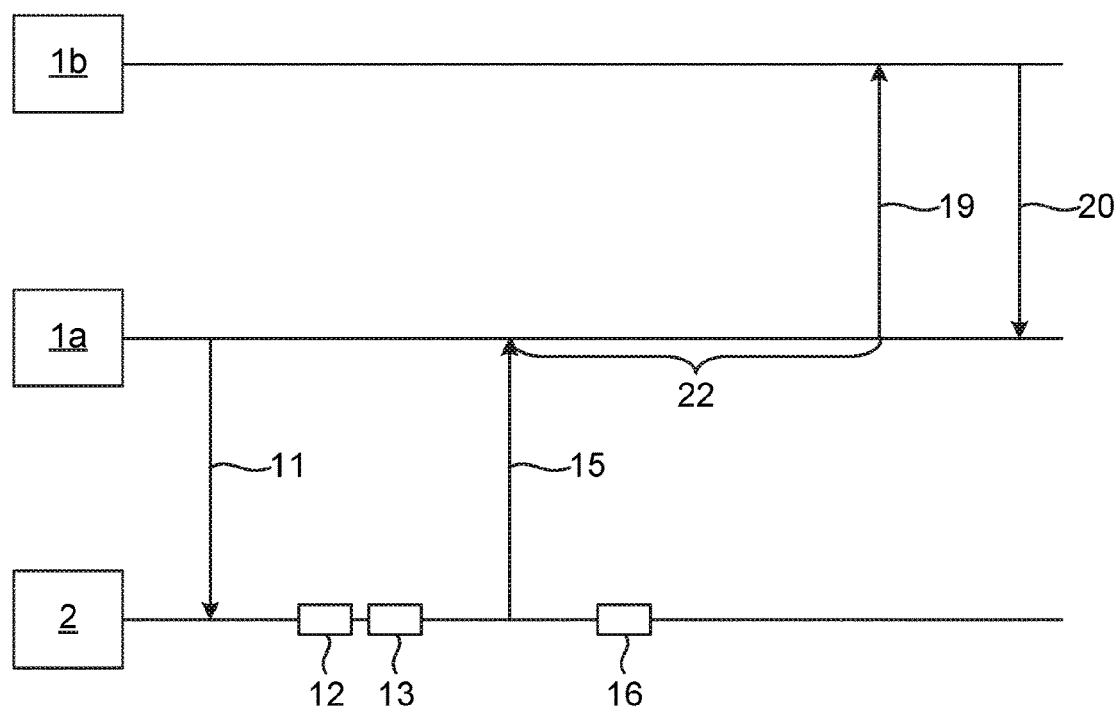
Fig. 2B
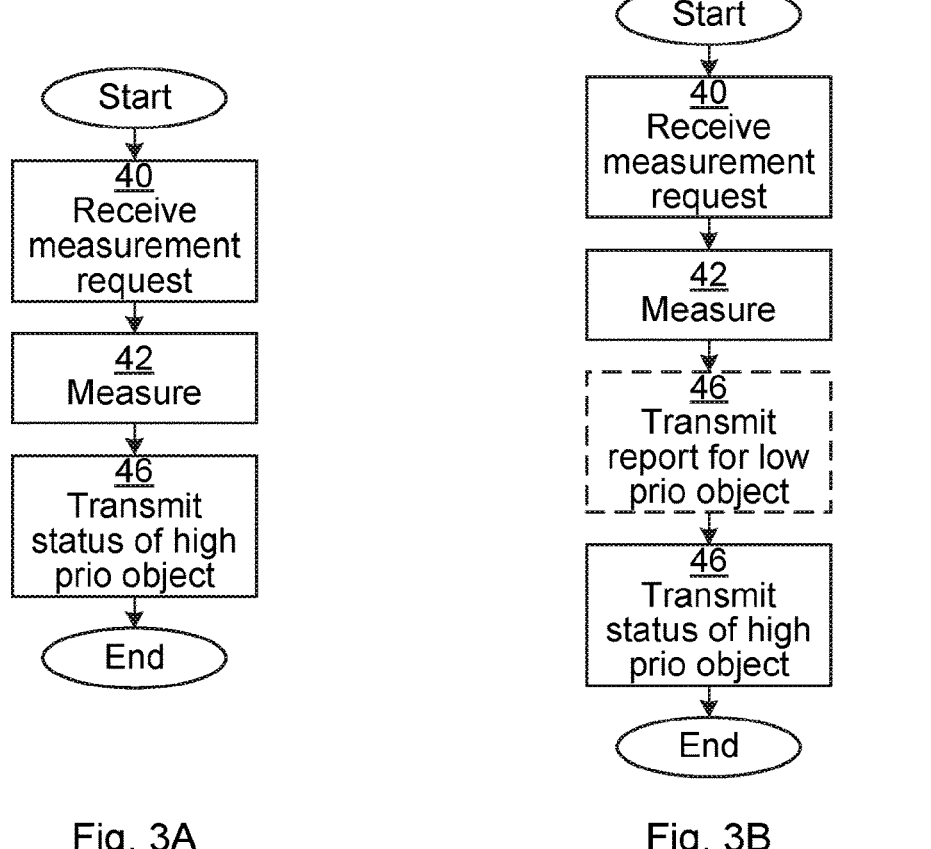
Fig. 3A                    Fig. 3B

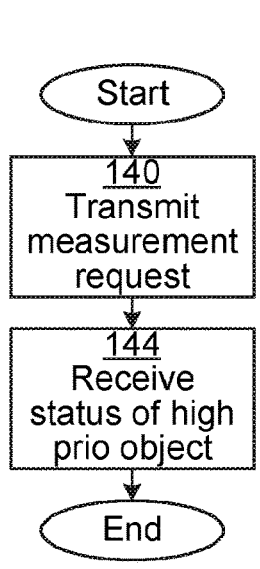
Fig. 4A
Fig. 4B
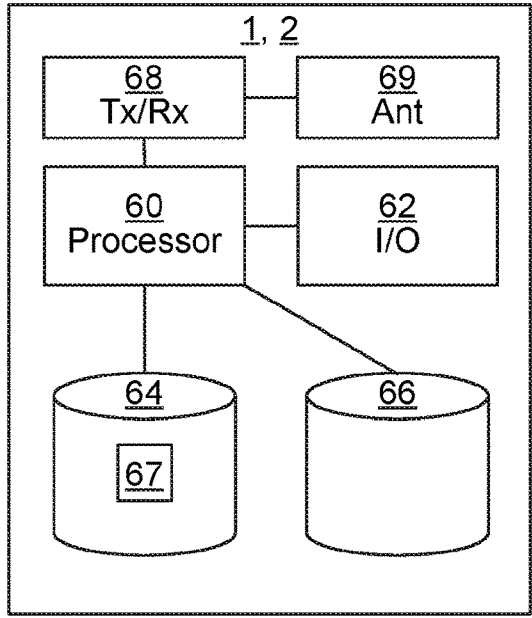
Fig. 5
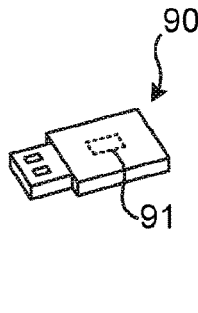
Fig. 6

MEASURING RADIO CHARACTERISTICS OF MEASUREMENT OBJECTS

CROSS-REFERENCE TO RELATED APPLICATION

This application is a Submission Under 35 U.S.C. § 371 for U.S. National Stage Patent Application of International Application Number: PCT/SE2021/050373, filed Apr. 23, 2021 entitled "MEASURING RADIO CHARACTERIS-TICS OF MEASUREMENT OBJECTS," the entirety of which is incorporated herein by reference.

TECHNICAL FIELD

The present disclosure relates to the field of measurements in cellular networks and in particular to measuring radio characteristics of measurement objects.

BACKGROUND

In cellular networks, instances of UE (User Equipment) are usually mobile within the cellular network. Since different radio cells cover different or overlapping areas, the UE regularly measures its radio environment. These measurements can be used to determine when to handover communication from one radio cell to another, or when to arrange dual connectivity. Dual connectivity allows a UE to simultaneously transmit and receive data on multiple component carriers from two serving network nodes (e.g. base stations), denoted a master node and a secondary node. Dual connectivity can be provided between two serving network nodes operating in the same technology, e.g. both NR (New Radio), both LTE (Long-term Evolution). Additionally, dual connectivity can be provided between two serving network nodes operating in different radio access technologies (RATs), such as a master node operating in LTE while a secondary node is operating in NR, or vice versa. For example, using an LTE master node and NR secondary node (known as EN-DC) allows networks to employ both 4G and 5G to increase user throughput utilizing the wide 5G spectrum, while providing the UE with a wider coverage, thanks to the 4G spectrum.

A network node (e.g. a base station) can request the UE to measure one or several measurement objects to determine if and how dual connectivity is to be set up. Each measurement object can relate to a radio cell, e.g. different frequencies.

The UE takes measurements in the order of when the measurement objects are available for measurement. The order of transmission of measurement objects from the network depends on many factors and cannot be transmitted in an order based on the priorities of measurement for a single UE. Hence, the measuring and reporting measurements by the UE to the network node might not be in an order according to the most prioritised measurement objects.

SUMMARY

One object is to improve how measurements are obtained when there are multiple measurement objects to measure.

According to a first aspect, it is provided a system for measuring radio characteristics of measurement objects. The system comprises a user equipment, UE, and a network node. The UE comprises: a processor; and a memory storing instructions that, when executed by the processor, cause the UE to: receive, from the network node, a request to measure and report radio measurements for at least a first measurement object and a second measurement object, wherein the request comprises a priority for each measurement object; measure radio characteristics of the first measurement object; and transmit measurement status of the second measurement object for which radio characteristics have yet to be measured, wherein the second measurement object has a higher priority than the first measurement object. The network node comprises: a processor; and a memory storing instructions that, when executed by the processor, cause the network node to: transmit, to the UE, the request to measure and report radio measurements; and receive the measurement status of the second measurements object for which radio characteristics have yet to be measured, wherein the second measurement object has a higher priority than the first measurement object.

According to a second aspect, it is provided a method for measuring radio characteristics of measurement objects, the method being performed by a user equipment, UE. The method comprises the steps of: receiving, from a network node, a request to measure and report radio measurements for at least a first measurement object and a second measurement object, wherein the request comprises a priority for each measurement object; measuring radio characteristics of the first measurement object; and transmitting measurement status of the second measurement object for which radio characteristics have yet to be measured, wherein the second measurement object has a higher priority than the first measurement object.

The method may further comprise the step of: transmitting a report of radio characteristics of the first measurement object.

The measurement status may indicate whether a measurement for the second measurement object has been initiated.

The measurement status may indicate whether an entering condition for an event of the second measurement object is satisfied, wherein the entering condition is evaluated based on whether radio characteristics specified for the entering condition are fulfilled.

The entering condition may specify that some radio characteristics need to occur during a specified duration.

The measurement objects may be distinguished by being associated with different frequencies.

According to a third aspect, it is provided a user equipment, UE, for measuring radio characteristics of measurement objects. The UE comprises: a processor; and a memory storing instructions that, when executed by the processor, cause the UE to: receive, from a network node, a request to measure and report radio measurements for at least a first measurement object and a second measurement object, wherein the request comprises a priority for each measurement object; measure radio characteristics of the first measurement object; and transmit measurement status of the second measurement object for which radio characteristics have yet to be measured, wherein the second measurement object has a higher priority than the first measurement object.

The UE may further comprise instructions that, when executed by the processor, cause the UE to: transmit a report of radio characteristics of the first measurement object.

The measurement status may indicate whether a measurement for the second measurement object has been initiated.

The measurement status may indicate whether an entering condition for an event of the second measurement object is satisfied, wherein the entering condition is evaluated based on whether radio characteristics specified for the entering condition are fulfilled.

The entering condition may specify that some radio characteristics need to occur during a specified duration.

According to a fourth aspect, it is provided a computer program for measuring radio characteristics of measurement objects. The computer program comprises computer program code which, when executed on a user equipment, UE, causes the UE to: receive, from a network node, a request to measure and report radio measurements for at least a first measurement object and a second measurement object, wherein the request comprises a priority for each measurement object; measure radio characteristics of the first measurement object; and transmit measurement status of the second measurement object for which radio characteristics have yet to be measured, wherein the second measurement object has a higher priority than the first measurement object.

According to a fifth aspect, it is provided a computer program product comprising a computer program according to the fourth aspect and a computer readable means on which the computer program is stored.

According to a sixth aspect, it is provided a method for measuring radio characteristics of measurement objects. The method being performed by a network node. the method comprises the steps of: transmitting, to a user equipment, UE, a request to measure and report radio measurements for at least a first measurement object and a second measurement object, wherein the request comprises a priority for each measurement object; and receiving measurement status of the second measurements object for which radio characteristics have yet to be measured, wherein the second measurement object has a higher priority than the first measurement object.

The method may further comprise the step of: receiving a report of radio characteristics of the first measurement object.

The method may further comprise the step of: performing a dual-connectivity operation for the UE.

The step of performing a dual-connectivity operation may be performed when the earlier of a first event and a second event occurs, wherein the first event is receiving radio characteristics of the second measurement object and the second event is an expiry of a timer that is started when the measurement status is received.

According to a seventh aspect, it is provided a network node for measuring radio characteristics of measurement objects. The network node comprises: a processor; and a memory storing instructions that, when executed by the processor, cause the network node to: transmit, to a user equipment, UE, a request to measure and report radio measurements for at least a first measurement object and a second measurement object, wherein the request comprises a priority for each measurement object; and receive measurement status of the second measurements object for which radio characteristics have yet to be measured, wherein the second measurement object has a higher priority than the first measurement object.

The network node may further comprise instructions that, when executed by the processor, cause the network node to: receive a report of radio characteristics of the first measurement object.

The network node may further comprise instructions that, when executed by the processor, cause the network node to: perform a dual-connectivity operation for the UE.

The network node may further comprise instructions that, when executed by the processor, cause the network node to execute the instructions to perform a dual-connectivity operation when the earlier of a first event and a second event occurs, wherein the first event is receiving radio characteristics of the second measurement object and the second event is an expiry of a timer that is started when the measurement status is received.

According to an eighth aspect, it is provided a computer program for measuring radio characteristics of measurement objects. The computer program comprises computer program code which, when executed on a network node causes the network node to: transmit, to a user equipment, UE, a request to measure and report radio measurements for at least a first measurement object and a second measurement object, wherein the request comprises a priority for each measurement object; and receive measurement status of the second measurements object for which radio characteristics have yet to be measured, wherein the second measurement object has a higher priority than the first measurement object.

According to a ninth aspect, it is provided a computer program product comprising a computer program according to the eighth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 2A-B are schematic diagrams illustrating signalling for measuring radio characteristics of measurement objects according to some embodiments;

FIGS. 3A-B are flow charts illustrating embodiments of methods performed by a UE for measuring radio characteristics of measurement objects;

FIGS. 4A-B are flow charts illustrating embodiments of methods performed by a network node for measuring radio characteristics of measurement objects;

FIG. 5 is a schematic diagram illustrating components of the UE and the network node of FIG. 1; and FIG. 6 shows one example of a computer program product comprising computer readable means.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein improve how information on measurements of measurement objects are provided from a UE to a requesting network node, where different measurement objects have different priorities. This is achieved by the UE, when sending a measurement report for a lower priority measurement object, also reporting a current status (e.g. measurement started, not started measurement yet, etc.) of a higher priority measurement object. This allows the requesting network node to make an informed decision on whether to wait for the higher priority measurement report or not, e.g. when deciding whether to connect the UE in dual-cell connectivity.

Figure 1:
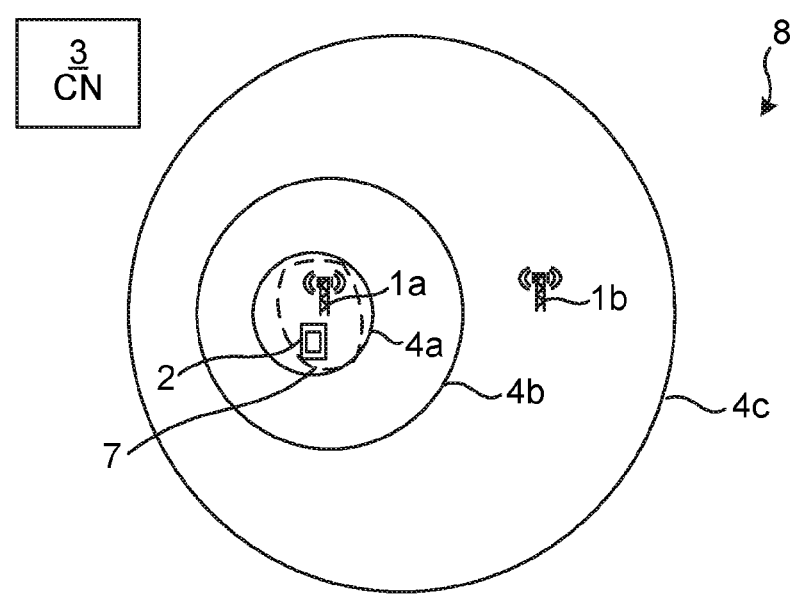
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and network nodes 1a-b, here in the form of radio base stations being evolved Node Bs, also known as eNode Bs or eNBs or gNode Bs. The network node 1 could also be in the form of Node Bs, BTSs (Base Transceiver Stations) and/or BSSs (Base Station Subsystems), etc. The network nodes 1a-b provide radio connectivity over a wireless interface to instances of user equipment (UE) 2. The term UE is also known as mobile communication terminal, wireless device, mobile terminal, user terminal, user agent, wireless terminal, machine-to-machine device etc., and can be, for example, what today are commonly known as a mobile phone, smart phone or a tablet/laptop with wireless connectivity.

The cellular communication network 8 may e.g. comply with any one or a combination of 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

The network nodes 1a-b are connected to the core network 3 for connectivity to central functions and a wide area network, such as the Internet.

A first network node 1a provides coverage using a first radio cell 4a and a second radio cell. The second radio cell 4b is larger than, and covers, the first radio cell 4a. A second network node 1b provides coverage using a third radio cell 4c. In this example, the third radio cell covers both the first radio cell 4a and the second radio cell 4b, and is larger than both of these radio cells 4a, 4b.

In the position of the UE 2 indicated in the example of FIG. 1, the UE could get coverage using the first radio cell 4a, the second radio cell 4b and/or the third radio cell 4c. Dual-cell connectivity can thereby be provided to the UE 2, where the UE is simultaneously connected to multiple radio cells. In this case, the second network node 1b can be a master node and can e.g. be an eNodeB, and the first network node 1a can be a secondary node and can e.g. be a gNodeB. The UE 2 can thus be connected to either or both network nodes 1a-b via the first radio cell 4a, the second radio cell 4b and/or the third radio cell 4c.

The network operator can configure priorities in cell connectivity for UEs. For instance, the first radio cell 4a can have the highest priority, the second radio cell 4b can have medium priority and the third radio cell can have low priority. In this way, the UE 2 can be configured to connect to the smallest radio cell available, leaving capacity in larger radio cells for UEs in other areas where coverage is not provided using the smaller radio cell. This can make the use of available spectrum resources more efficient.

In the prior art, the UE 2 sends a measurement report in accordance with a request from the network of a certain measurement object (e.g. frequency of a radio cell) which is measured at the UE 2 first in time. When the first measurement report is favourable for a lower priority radio cell, this can result in the UE 2 connecting to that radio cell, even though the UE 2 might be able to connect to a higher priority radio cell for which measurements have not been acquired yet. The UE measures measurement objects (that are indicated in the request) in the arder that they are measurable (i.e. transmitted from the network), which might not be in the order of priority. This is the reason that the lower priority measurement object might be measured before the higher priority measurement object.

According to embodiments presented herein, even when the UE 2 first sends a measurement report for a lower priority measurement object, the UE 2 also reports a current status (e.g. measurement started, not started measurement yet, etc.) of a higher priority measurement object, allowing the requesting network node to make an informed decision on whether to wait for the higher priority measurement report or not, when deciding whether to connect the UE 2 in dual-cell connectivity.

Figure 2A:
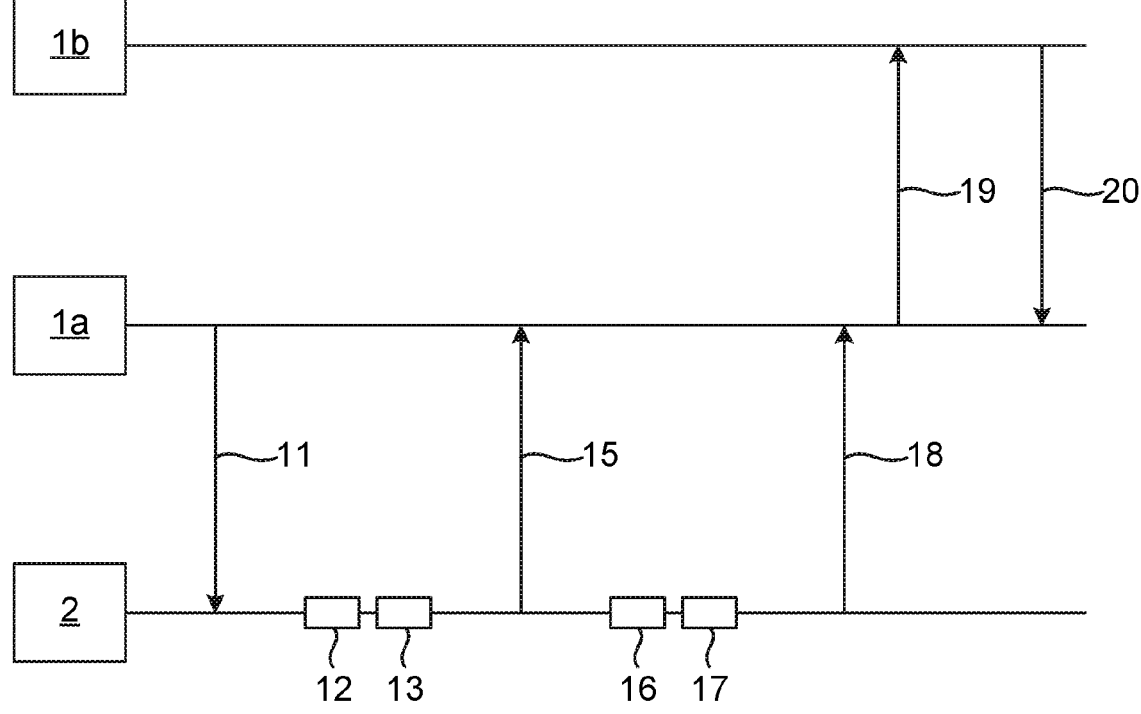

FIGS. 2A-B are schematic diagrams illustrating signalling for measuring radio characteristics of measurement objects according to one illustrative example. Time flows from left to right. Events are shown for the UE 2, the first network node 1a and the second network node 1b of FIG. 1.

Looking first to FIG. 2A. the first network node 1a sends a request 11 to measure and report radio measurements for at least a first measurement object and a second measurement object. The request 11 comprises a priority for each measurement object. The measurement objects are the objects on which the UE shall perform the measurements. The measurement object can be any frequency of any RAT, e.g. NR, LTE, etc. Alternatively, the measurement object can be specified as a SSB (Synchronization System Block) or CSI-RS (Channel State Information Reference Signal). The request 11 can be in the form of a RRC (Radio Resource Control) connection reconfiguration signal.

The priority indicates how much the network node prefers the associated measurement object to be measured and used by the UE e.g. to make more efficient use of radio spectrum. The priority can be specified in any suitable format. For instance, the priority can be a numeric value ranging from 0 to any positive value. As an example, used herein, the priority can range from 0 to 7, wherein 7 is the highest priority. Alternatively, the 0 can indicate the highest priority.

In this example, the measurement objects are different frequencies f1, f2 and f3. The request 11 specifies three measurement objects for the different frequencies f1, f2, f3 with three different priorities, f1 with priority 5, f2 with priority 6 and f3 with priority 7. Hence f3 has the highest priority, followed by f2 and f1 has the lowest priority.

After the UE 2 receives the request 11, the UE 2 performs measurements accordingly on the specified measurement objects, in the order of the measurement objects becoming measurable by the UE. Hence, the UE can measure measurement objects of lower priority before measurement objects of higher priority, or vice versa.

In the example of FIG. 2A, the UE 2 starts 12 measurement for f1 and f3, as determined by the UE 2. In this example, the UE 2 first acquires 13 measurements for f1 (lowest priority). The measurement result for f3 (highest priority) is not yet available.

The UE 2 sends, to the first network node 1a, a first signal 15 comprising a measurement report for the measurement results of f1 and also the measurement status of f3. Optionally, the status of the higher priority measurement object(s)

is only reported if this is explicitly configured in the request 11. Such configuration can be a blanket configuration for all measurement objects or specified for one on more measurement objects. Alternatively, the UE is configured to always report the status of any higher priority measurement object(s).

The status can e.g. be any one of the following: measurement not started, measurement started or entering condition is satisfied. The entering condition is evaluated based on whether radio characteristics specified for the entering condition are fulfilled, e.g. as presented in 3GPP TS36.331 v16.0.0, section 5.5.4, by comparing measured radio characteristics against the radio characteristics specified for the entering condition. It is to be noted that there does not need to be an explicit status for measurements received, since in such a case, the measurement is included in the signal.

At some point the UE 2 starts 16 measurements for f2. In this example, the UE 2 acquires 17 measurements for f3 (highest priority) and transmits a second signal 18 to the first network node 1*a*, wherein the second signal 18 comprises the measurements for f3.

The first network node 1*a* now has measurements for both f1 and f3 and can, when f3 measurements are satisfactory, transmit a request 19 to the second network node to add a channel based on f3, to achieve dual connectivity for the UE 2. The second network node 1*b* confirms 20 the channel addition.

In this way, looking to FIG. 1, the first network node 1*a* can e.g. add a connection for the first radio cell 4*a*, in addition to the third radio cell 4*c*, achieving dual connectivity for the UE 2.

It is to be noted that the first signal 15 can contain measurement status for all measurement objects that have a higher priority than the one for which the measurement has been acquired, if there are more than one. Measurements and measurement status for measurement objects that have lower priority than the one for which the measurement has been acquired are not reported to the first network node 1*a*. This reduces resource usage for the lower priority measurement objects that are irrelevant for the network node 1*a*.

Looking now to FIG. 2B, this shows an embodiment with a timer. Most processing is the same as that illustrated in FIG. 2A. Here however, when the first network node 1*a* receives the signal 15 containing measurements for f1 and measurement status for f3, the first network node 1*a* starts a timer with a certain duration 22. If the timer expires and no measurement for f3 has been received, the first network node 1*a* proceeds with dual connectivity processing based on the measurements that it has received thus far. It is to be noted that if the first network node 1*a* does receive measurements for f3 prior to expiry of the timer, the procedure is the same as that illustrated in FIG. 2A.

FIGS. 3A-B are flow charts illustrating embodiments of methods for measuring radio characteristics of measurement objects. The methods are performed by a UE 2. Different measuring objects can e.g. be distinguished by different frequencies, e.g. for different component carriers. Alternatively or additionally, different measuring objects can be distinguished by different codes, e.g. for CDMA (Code-Division Multiple Access) based systems. The methods correspond to the operations by the UE 2 in FIGS. 2A-B.

In a receive measurement request step 40, the UE 2 receives (from a network node 1, 1*a-c*) a request 11 to measure and report radio measurements for at least a first measurement object and a second measurement object. The request 11 comprises a priority for each measurement object.

In a measure step 42, the UE 2 measures radio characteristics of the first measurement object.

In a transmit status of high priority object step 46, the UE 2 transmits measurement status 15 of the second measurement object for which radio characteristics have yet to be measured, to the network node. The second measurement object has a higher priority than the first measurement object. The measurement status 15 indicates whether a measurement for the second measurement object has been initiated. This can include transmitting measurement status of all measurement object for which radio characteristics have yet to be measured and that have a higher priority than the first measurement object.

The measurement status optionally indicates whether an entering condition for an event of the second measurement object is satisfied. The entering condition is evaluated based on whether radio characteristics specified for the entering condition are fulfilled, e.g. as specified in 3GPP TS36.331 v16.0.0, section 5.5.4. The entering condition can specify that some radio characteristics need to occur during a specified duration. The specified duration is also known as time-to-trigger (TTT).

It is to be noted that when measurement results for a highest priority measurement object among the configured measurement objects is available, the UE does not send the measurement status information for any other (lower priority) measurement objects. The UE only sends the measurement results on the highest priority measurement object.

If there are multiple measurement objects that have same priority/preference information, the UE also sends the measurement status information on other measurements objects that has the same priority.

It is to be noted that the measurement status can be included in a measurement report message or any suitable message from the UE to the network node.

Looking now to FIG. 3B, only new or modified steps compared to the steps illustrated in FIG. 3A will be described.

In an optional transmit report for low priority object step 44, the UE 2 transmits a report of radio characteristics of the first measurement object to the network node. This allows the network node to evaluate whether to direct the UE to connect to a channel associated with the low priority object.

FIGS. 4A-B are flow charts illustrating embodiments of methods for measuring radio characteristics of measurement objects. The methods are performed by a network node 1, 1*a-c*. The methods correspond to the operations by the first network node 1*a* in FIGS. 2A-B.

In a transmit measurement request step 140, the network node transmits (to a UE) a request 11 to measure and report radio measurements for at least a first measurement object and a second measurement object. The request comprises a priority for each measurement object.

In a receive status of high prio(rity) object step 144, the network node receives measurement status 15 of the second measurements object for which radio characteristics have yet to be measured. The second measurement object has a higher priority than the first measurement object.

Looking now to FIG. 4B, only new or modified steps compared to the steps illustrated in FIG. 4A will be described.

In an optional receive report for low pio(rity) object step 142, the network node receives a report of radio characteristics of the first measurement object.

In an optional perform dual-connectivity operation step 146, the network node performs a dual-connectivity operation for the UE 2. This is performed based on the information received from the UE, i.e. the measurement status of the second measurement object and, when available, the radio characteristics of the first measurement object.

Optionally, the perform a dual-connectivity operation step 146 is performed when the earlier of a first event and a second event occurs. The first event is receiving radio characteristics of the second measurement object and the second event is an expiry of a timer that is started when the measurement status is received. In other words, in such an embodiment (illustrated in FIG. 2B and described above) dual-connectivity is triggered by receiving radio characteristics of the second measurement object or the timer expiry, whichever happens first.

FIG. 5 is a schematic diagram illustrating components of the UE 2 and the network node 1 of FIG. 1. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-B and FIGS. 4A-B above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities. Optionally, the I/O interface 62 also includes a user interface.

A transceiver 68 comprising digital and analogue components is provided. The transceiver, together with antenna, are provided for communication of user data and control data in a cellular network.

Other components are omitted in order not to obscure the concepts presented herein.

FIG. 6 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for measuring radio characteristics of measurement objects, the system comprising a user equipment, UE, and a network node, the UE comprising:
   a processor; and
   a memory storing instructions that, when executed by the processor, cause the UE to:
   receive, from the network node, a request to measure and report radio measurements for at least a first measurement object and a second measurement object, the request comprising a priority for each measurement object;
   measure radio characteristics of the first measurement object; and
   transmit measurement status of the second measurement object for which radio characteristics have yet to be measured, the second measurement object having a higher priority than the first measurement object;
   the network node comprising:
   a processor; and
   a memory storing instructions that, when executed by the processor, cause the network node to:
   transmit, to the UE, the request to measure and report radio measurements; and
   receive the measurement status of the second measurements object for which radio characteristics have yet to be measured, the second measurement object having a higher priority than the first measurement object.

2. A method for measuring radio characteristics of measurement objects, the method being performed by a user equipment, UE, the method comprising the steps of:
   receiving, from a network node, a request to measure and report radio measurements for at least a first measurement object and a second measurement object, the request comprising a priority for each measurement object;
   measuring radio characteristics of the first measurement object; and
   transmitting measurement status of the second measurement object for which radio characteristics have yet to be measured, the second measurement object having a higher priority than the first measurement object.

3. The method according to claim 2, further comprising the step of:
   transmitting a report of radio characteristics of the first measurement object.

4. The method according to claim 2, wherein the measurement status indicates whether a measurement for the second measurement object has been initiated.

5. The method according to claim 2, wherein the measurement status indicates whether an entering condition for an event of the second measurement object is satisfied, wherein the entering condition is evaluated based on whether radio characteristics specified for the entering condition are fulfilled.

6. The method according to claim 5, wherein the entering condition specifies that some radio characteristics need to occur during a specified duration.

7. The method according to claim 2, wherein the measurement objects are distinguished by being associated with different frequencies.

8. A user equipment, UE, for measuring radio characteristics of measurement objects, the UE comprising:

a processor; and a memory storing instructions that, when executed by the processor, cause the UE to:

receive, from a network node, a request to measure and report radio measurements for at least a first measurement object and a second measurement object, the request comprising a priority for each measurement object;

measure radio characteristics of the first measurement object; and transmit measurement status of the second measurement object for which radio characteristics have yet to be measured, the second measurement object having a higher priority than the first measurement object.

9. The UE according to claim 8, further comprising instructions that, when executed by the processor, cause the UE to:

transmit a report of radio characteristics of the first measurement object.

10. The UE according to claim 8, wherein the measurement status indicates whether a measurement for the second measurement object has been initiated.

11. The UE according to claim 8, wherein the measurement status indicates whether an entering condition for an event of the second measurement object is satisfied, wherein the entering condition is evaluated based on whether radio characteristics specified for the entering condition are fulfilled.

12. The UE according to claim 11, wherein the entering condition specifies that some radio characteristics need to occur during a specified duration.

13. A non-transitory computer storage medium storing a computer program for measuring radio characteristics of measurement objects, the computer program comprising computer program code which, when executed on a user equipment, UE, causes the UE to:

receive, from a network node, a request to measure and report radio measurements for at least a first measurement object and a second measurement object, the request comprising a priority for each measurement object;

measure radio characteristics of the first measurement object; and transmit measurement status of the second measurement object for which radio characteristics have yet to be measured, the second measurement object having a higher priority than the first measurement object.

14. A method for measuring radio characteristics of measurement objects, the method being performed by a network node, the method comprising the steps of:

transmitting, to a user equipment, UE, a request to measure and report radio measurements for at least a first measurement object and a second measurement object, the request comprising a priority for each measurement object; and receiving measurement status of the second measurements object for which radio characteristics have yet to be measured, the second measurement object having a higher priority than the first measurement object.

15. The method according to claim 14, further comprising the step of:

receiving a report of radio characteristics of the first measurement object.

16. The method according to claim 14, further comprising the step of:

performing a dual-connectivity operation for the UE.

17. The method according to claim 16, wherein the step of performing a dual-connectivity operation is performed when the earlier of a first event and a second event occurs, wherein the first event is receiving radio characteristics of the second measurement object and the second event is an expiry of a timer that is started when the measurement status is received.

* * * * *